(12) United States Patent
Shiraishi

(10) Patent No.: US 10,878,581 B2
(45) Date of Patent: Dec. 29, 2020

(54) MOVEMENT DETECTION FOR AN IMAGE INFORMATION PROCESSING APPARATUS, CONTROL METHOD, AND PROGRAM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 22 days.

(21) Appl. No.: 16/468,327

(22) PCT Filed: Dec. 14, 2016

(86) PCT No.: PCT/JP2016/087282
§ 371 (c)(1),
(2) Date: Jun. 11, 2019

(87) PCT Pub. No.: WO2018/109879
PCT Pub. Date: Jun. 21, 2018

(65) Prior Publication Data
US 2020/0090346 A1 Mar. 19, 2020

(51) Int. Cl.
*G06T 7/00* (2017.01)
*G06T 7/246* (2017.01)
(Continued)

(52) U.S. Cl.
CPC .............. *G06T 7/248* (2017.01); *G06T 7/269* (2017.01); *G08B 13/19602* (2013.01); *G06T 2207/30196* (2013.01); *G06T 2207/30232* (2013.01)

(58) Field of Classification Search
CPC ........... G06T 7/269; G06T 2207/30196; G06T 2207/30232; G06T 7/248; G08B 13/19602
See application file for complete search history.

(56) References Cited

U.S. PATENT DOCUMENTS

2007/0279494 A1\* 12/2007 Aman .................... H04N 5/262
348/169
2008/0158361 A1    7/2008 Itoh et al.
(Continued)

FOREIGN PATENT DOCUMENTS

JP    H10-97687 A    4/1998
JP    2008-104130 A    5/2008
(Continued)

OTHER PUBLICATIONS

International Search Report for PCT Application No. PCT/JP2016/087282, dated Mar. 7, 2017.

*Primary Examiner* — Pakee Fang

(57) ABSTRACT

A determination unit determines whether or not a first foreground area extracted from a first captured image represents a moving object. A warning unit outputs warning when the first foreground area is determined to be not representing the moving object. The first foreground area is determined to be not representing the moving object when the object represented by the first foreground area is not moving. First, the determination unit determines whether or not the object represented by the first foreground area is moving by comparing the first foreground area with a second foreground area extracted from a second captured image generated before the first captured image. Then, the determination unit determines whether or not the object is moving at time before the first captured image is generated based on information of the object at time before the first captured image is generated.

13 Claims, 13 Drawing Sheets

(51) Int. Cl.
  *G06T 7/269*   (2017.01)
  *G08B 13/196*  (2006.01)

(56) References Cited

U.S. PATENT DOCUMENTS

| | | | |
|---|---|---|---|
| 2012/0062732 A1* | 3/2012 | Marman | G08B 13/19682 |
| | | | 348/142 |
| 2015/0179219 A1* | 6/2015 | Gao | G06T 7/254 |
| | | | 386/278 |
| 2016/0125268 A1 | 5/2016 | Ebiyama | |
| 2016/0202065 A1* | 7/2016 | Chen | G01C 21/165 |
| | | | 382/103 |
| 2017/0228876 A1 | 8/2017 | Ebiyama | |

FOREIGN PATENT DOCUMENTS

| | | |
|---|---|---|
| JP | 2010-277264 A | 12/2010 |
| JP | 2011-049646 A | 3/2011 |
| JP | 2011-070332 A | 4/2011 |
| JP | 2011-217201 A | 10/2011 |
| WO | 2014/192441 A1 | 12/2014 |
| WO | 2016/021147 A1 | 2/2016 |

* cited by examiner

MOVEMENT DETECTION FOR AN IMAGE INFORMATION PROCESSING APPARATUS, CONTROL METHOD, AND PROGRAM

This application is a National Stage Entry of PCT/JP2016/087282 filed on Dec. 14, 2016, the contents of all of which are incorporated herein by reference, in their entirety.

TECHNICAL FIELD

The present invention relates to an information processing apparatus, a control method, and a program.

BACKGROUND ART

There is a case where an exhibited product is stolen in a store. Here, in order to prevent theft of the product, a security guard is on guard while walking around in the store or surveils a video of a surveillance camera.

However, a lot of labors are required to manually perform surveillance. In addition, it is difficult to manually surveil all places where products are exhibited normally, and there is a possibility that lack of surveillance occurs.

Thus, a system for detecting theft or the like of an object using an information processing technology is developed. Patent Document 1 discloses a technology for determining an acquired product by detecting an image including a person from a surveillance video and taking an image difference between images acquired before and after the detected image.

Patent Document 2 discloses a technology for detecting a motionless object which stops for predetermined time as an abandoned object, by performing a difference operation between a reference image and a comparison image. Furthermore, Patent Document 2 discloses a technology for detecting the theft of the object by causing the stolen object to be determined as the motionless object using an image that includes a surveillance target object as a reference image.

Patent Document 3 discloses a technology for detecting an abandoned object based on a difference between two types of background differences such as a long-term difference and a middle-term difference. In the long-term difference, both a moving object and the abandoned object are detected. In the middle-term difference, only the moving object is detected. Thus, only the abandoned object is detected by comparing the two types of differences.

RELATED DOCUMENT

Patent Document

[Patent Document 1] Japanese Patent Application Publication No. 2010-277264
[Patent Document 2] Japanese Patent Application Publication No. 2008-104130
[Patent Document 3] International Publication No. WO2016/021147

SUMMARY OF THE INVENTION

Technical Problem

In the technology disclosed in Patent Document 1, there is a risk to cause misdetection when a plurality of persons come in an imaging range of a surveillance camera. For example, it is assumed that, after a person A comes in the imaging range of the surveillance camera, a person B comes in. In this case, when a difference is taken between images acquired before and after the person A comes in the imaging range, the person B who comes in the imaging range afterwards is detected as an acquired product. In the technology disclosed in Patent Document 2, there is a risk to erroneously detect a moving object that stands still as an abandoned object. In the technology of Patent Document 3, it is assumed that an object whose stay time is long is an abandoned object and an object whose stay time is short is a moving object. For this reason, it is difficult to appropriately set the stay time used to discriminate the abandoned object and the moving object, and thus there is a risk to erroneously detect a moving object as an abandoned object or to erroneously detect a moving object as an abandoned object.

The present invention is made in view of the above problems. An object of the present invention is to provide a technology for accurately detecting theft of the product through image processing.

Solution to Problem

An information processing apparatus according to the present invention includes: (1) a determination unit that determines whether or not a first foreground area represents a moving object, the first foreground area being extracted from a first captured image generated by a camera; and (2) a warning unit that outputs warning when it is determined that the first foreground area does not represent a moving object.

The determination unit executes: (1) performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image; (2) acquiring history information which represents information regarding the object represented by the first foreground area at time before the first captured image is generated, and performing second determination of determining whether or not the object represented by the first foreground area is moving at the time before the first captured image is generated based on the acquired history information; and (3) determining that the first foreground area does not represent the moving object when the object represented by the first foreground area is determined to be not moving by both of the first determination and the second determination.

A control method according to the present invention is executed by a computer.

The control method includes (1) a determination step of determining whether or not a first foreground area represents a moving object, the first foreground area being extracted from a first captured image generated by a camera; and (2) a warning step of outputting warning when it is determined that the first foreground area does not represent a moving object.

In the determination step, it is executed: (1) performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image; (2) acquiring history information which represents information regarding the object represented by the first foreground area at time before the first captured image is generated, and performing second determination of determining whether or not the object represented by the first foreground area is moving at the time before the first captured image is generated based on the acquired history information; and (3) determining that the first foreground area does not represent the moving object when the object represented by the first foreground area is determined to be not moving by both of the first determination and the second determination.

A program according to the present invention causes the computer to execute each step included in the control method according to the present invention.

Advantageous Effects of Invention

According to the present invention, there is provided a technology which accurately detects theft of a product through image processing.

BRIEF DESCRIPTION OF THE DRAWINGS

The above-described object, other objects, features, and advantages will be further clear through preferable embodiments which will be described below and accompanying drawings below.

DESCRIPTION OF EMBODIMENTS

Hereinafter, embodiments of the present invention will be described with reference to the accompanying drawings. Also, in all drawings, the same symbols are attached to the same components, and description is appropriately omitted. In addition, unless particular description is performed, each block in each block diagram represents a configuration in function units instead of a configuration in hardware units.

First Example Embodiment

<Concept of Operation of Information Processing Apparatus 2000>

Figure 1:
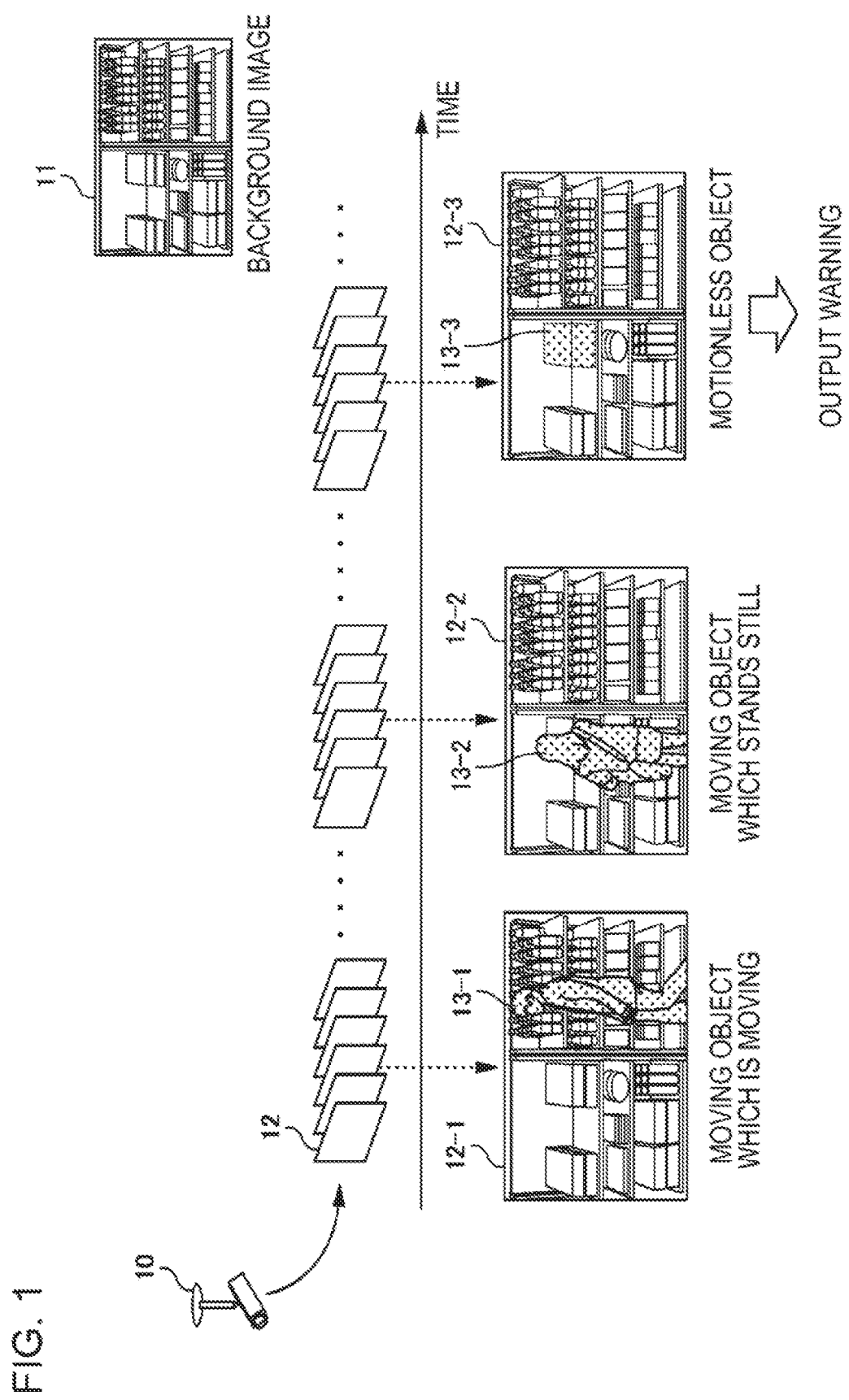
FIG. 1 is a diagram conceptually illustrating an operation of an information processing apparatus according to a first example embodiment.

FIG. 1 is a diagram conceptually illustrating an operation of an information processing apparatus 2000 according to a first example embodiment. Note that, FIG. 1 is a diagram for illustration aiming at easy understanding of the operation of the information processing apparatus 2000, and the operation of the information processing apparatus 2000 is not limited to FIG. 1 at all.

A camera 10 performs imaging repeatedly and generates a plurality of captured images 12. For example, the plurality of captured images 12, which are generated, are frame groups included in video data. An imaging target of the camera 10 is optional. For example, the camera 10 images an exhibition place (for example, a product shelf) where products are exhibited.

The information processing apparatus 2000 determines whether or not a first foreground area 13, which is extracted from the first captured images 12 generated by the camera 10, represents a moving object. Furthermore, when it is determined that the first foreground area 13 does not represent the moving object, the information processing apparatus 2000 outputs a warning.

The foreground area, which is extracted from the captured images 12, is an area which is extracted by acquiring a difference between the captured images 12 and the background image 11. For example, among the captured images 12 which are generated by the camera 10, a captured image 12, which does not include the moving object, is used as the background image 11. The background image 11 will be described in detail later.

At least the following two types are considered as the object which is represented by the first foreground area 13. A first type is the moving object such as a person or a shopping cart. Since the moving object is not included in the background image 11, the moving object is extracted as the foreground area by taking the difference between the captured image 12 and the background image 11.

In FIG. 1, persons are captured in both a captured image 12-1 and a captured image 12-2. For this reason, areas which represent the persons are extracted as the first foreground area 13. Note that, a first foreground area 13-1 extracted from the captured image 12-1 represents a moving person. On the other hand, a first foreground area 13-2 extracted from the captured image 12-2 represents a stopping person.

A second type is a motionless object other than products. For example, it is assumed that a person takes away an exhibited product. In this case, an area where the product, which is taken away, is exhibited is changed from a relevant area on the background image 11. For this reason, when a difference between the captured image 12, which is acquired by the camera 10 after the product is taken away, and the background image 11 is taken, an area where the product which is taken away is exhibited is extracted as the foreground area. When a captured image 12-3 of FIG. 1 is compared with the background image 11, a product which is represented by a dot pattern does not exist. For this reason, a first foreground area 13-3, which represents the product, is extracted as the foreground area.

The information processing apparatus 2000 outputs the warning when the first foreground area 13 does not represent the moving object (the first type object). In this manner, when the motionless object included in the background image 11 is moved, the warning is output. When the warning is received, it is possible for a user (for example, a manager, a security guard, or the like of the store) of the information processing apparatus 2000 to easily recognize that there is a possibility that a product is stolen.

<Outline of Configuration of Information Processing Apparatus 2000>

Figure 2:
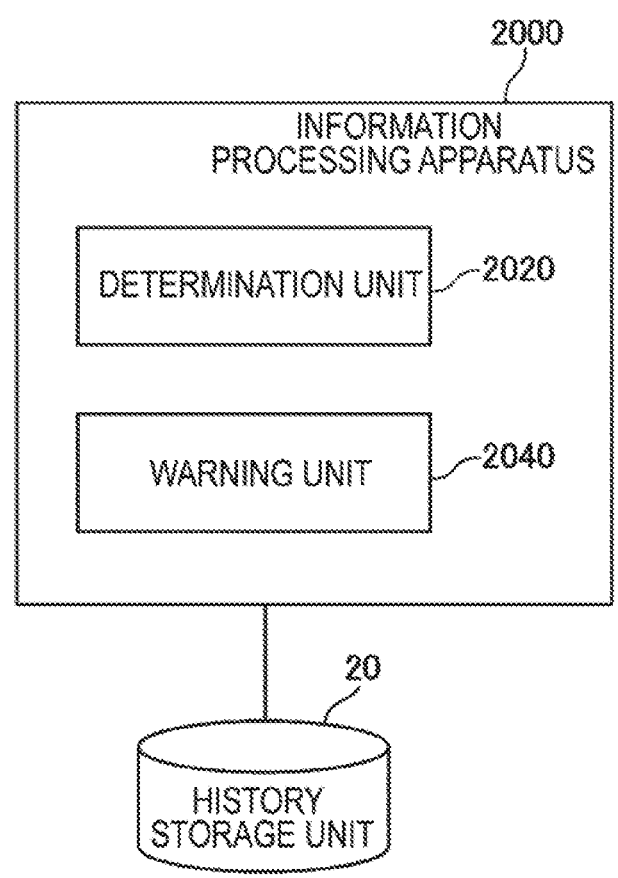
FIG. 2 is a diagram illustrating the information processing apparatus according to the first example embodiment.

FIG. 2 is a diagram illustrating the information processing apparatus 2000 according to the first example embodiment. The information processing apparatus 2000 includes a determination unit 2020 and a warning unit 2040. The determination unit 2020 determines whether or not the first foreground area 13 represents the moving object by performing first determination and second determination, the first foreground area 13 being extracted from the first captured image 12. The warning unit 2040 outputs the warning when it is determined that the first foreground area 13 does not represent the moving object.

Hereinafter, the first determination and the second determination will be described. The determination unit 2020 acquires the first foreground area 13 and a second foreground area, and compares the first foreground area 13 with a second foreground area 14 to determine whether or not the object represented by the first foreground area 13 is moving. The first foreground area 13 is as described above. The second foreground area is a foreground area that is extracted from a second captured image 12 that is generated by the camera 10 before the first captured image 12, and is a foreground area which represents the same object as in the first foreground area 13. For example, a captured image 12 used as the second captured image 12 is generated a predetermined time before or a predetermined frame before the first captured image 12.

Figure 3:
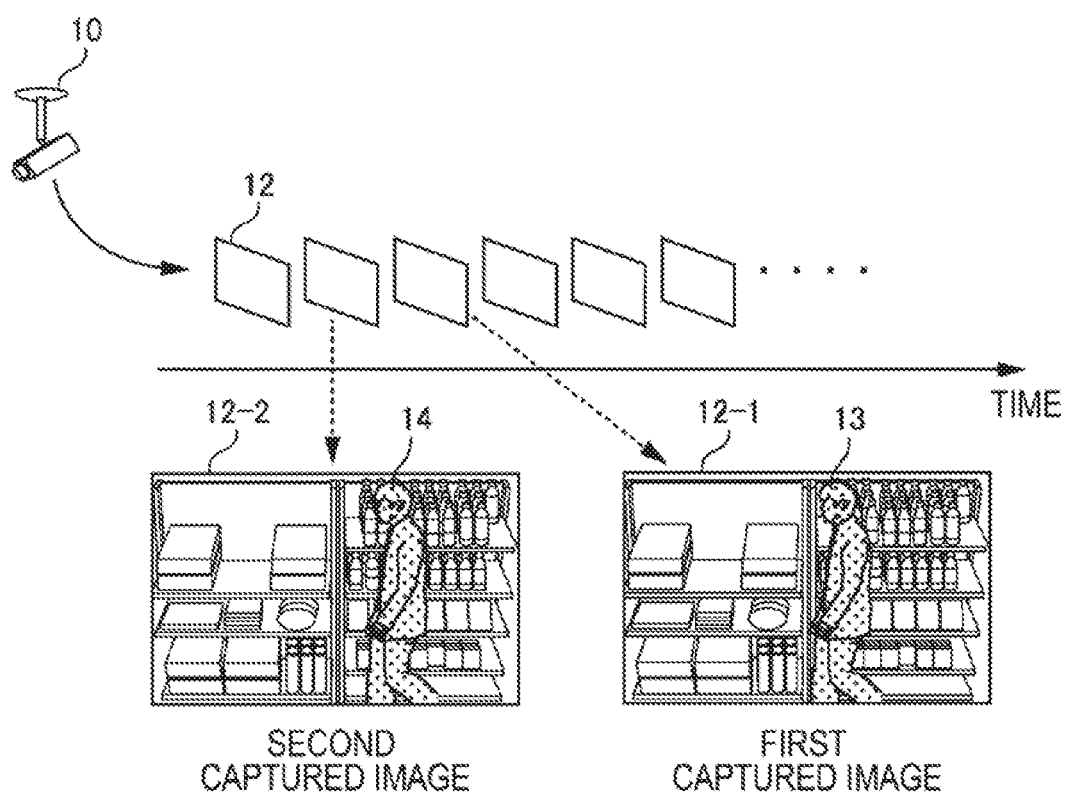
FIG. 3 is a diagram illustrating a first foreground area and a second foreground area.

FIG. 3 is a diagram illustrating the first foreground area and the second foreground area. In FIG. 3, the first captured image 12 is the captured image 12-1. Furthermore, a foreground area extracted from the captured image 12-1 is handled as the first foreground area (first foreground area 13).

In addition, in FIG. 3, the captured image 12-2, which is the captured image 12 acquired one frame before the first captured image 12, is handled as the second captured image 12. For this reason, the foreground area, which is extracted from the captured image 12-2 and which represents the same object as in the first foreground area 13, is handled as the second foreground area (second foreground area 14).

Here, it is assumed that it is determined that an object represented by the first foreground area 13 is not moving through the first determination. According to the determination, it is understood that the object represented by the first foreground area 13 is not moving at a timing in which the first captured image 12 is generated.

However, as a case which is determined as described above, there may be not only a case where the first foreground area 13 does not represent the moving object but also a case where the first foreground area 13 represents a moving object that stands still (a case where the moving object represented by the first foreground area 13 stands still at the timing in which the first captured image 12 is generated). For example, when the respective captured images 12 in FIG. 1 are processed by the information processing apparatus 2000, it is determined that "the object represented by the first foreground area 13 is not moving" in the first determination not only for the first foreground area 13-3 representing the motionless object, but also for the first foreground area 13-2 representing the moving object that stands still.

Here, the determination unit 2020 performs the second determination in addition to the first determination. In the second determination, the determination unit 2020 determines whether or not the object, which is represented by the first foreground area 13, is moving using history information stored in a history storage unit 20 at a time before a time in which the first captured image 12 is generated. The history information represents information, which is acquired at a time before the time in which the first captured image 12 is generated, in relation to the object which is represented by the first foreground area 13.

Furthermore, when it is determined that "the object, which is represented by the first foreground area 13 is not moving" in both the first determination and the second determination, the determination unit 2020 determines that the first foreground area 13 does not represent the moving object.

For example, in a case of the person who is represented by the first foreground area 13-2 of FIG. 1, a state in which the person is moving is captured in the captured image 12 which is generated before the captured image 12-2. For this reason, in the second determination using the history information, it is determined that an object which is represented by the first foreground area 13-2 is moving. Therefore, the determination unit 2020 determines that "the first foreground area 13-2 represents the moving object" based on the results of the first determination and the second determination. As a result, the warning is not output.

On the other hand, in a case of the product which is represented by the first foreground area 13-3 of FIG. 1, a state in which the product is moving is not captured even in the captured image 12 which is generated before the captured image 12-3. For this reason, even in the second determination using the history information, it is determined that "an object which is represented by the first foreground area 13-3 is not moving". Therefore, the determination unit 2020 determines that "the first foreground area 13-3 does not represent the moving object" based on the results of the first determination and the second determination. As a result, the warning is output by the warning unit 2040.

<Advantageous Effects>

In the information processing apparatus 2000 according to the embodiment, the second determination using the history information is performed in addition to the first determination using comparison of the first foreground area 13 with the second foreground area 14, and thus it is determined whether or not the foreground area represents the moving object. Accordingly, it is possible to accurately discriminate between the moving object which is stopping and the motionless object which is moved. Therefore, it is possible to accurately detect that the motionless object is moved. As a result, it is possible to accurately detect theft of the object.

Note that, when a plurality of first foreground areas 13 (for example, a plurality of persons are included) are extracted from the first captured image 12, the information processing apparatus 2000 according to the embodiment performs the first determination and the second determination, which are described above, on each of the first foreground areas 13. In this manner, it is possible to accurately perform determination of whether or not the first foreground area 13 represents the moving object for each of the first foreground areas 13.

Hereinafter, the embodiment will be described in further detail.

<Example of Hardware Configuration of Information Processing Apparatus 2000>

Respective functional configuration units of the information processing apparatus 2000 may be realized by hardware (for example, a hard-wired electronic circuit or the like) which realizes the respective functional configuration units, or may be realized through a combination (for example, a combination of an electronic circuit and a program, which controls the electronic circuit, or the like) of hardware and software. Hereinafter, a case where the respective functional configuration units of the information processing apparatus 2000 are realized through the combination of the hardware and the software will be further described.

Figure 4:
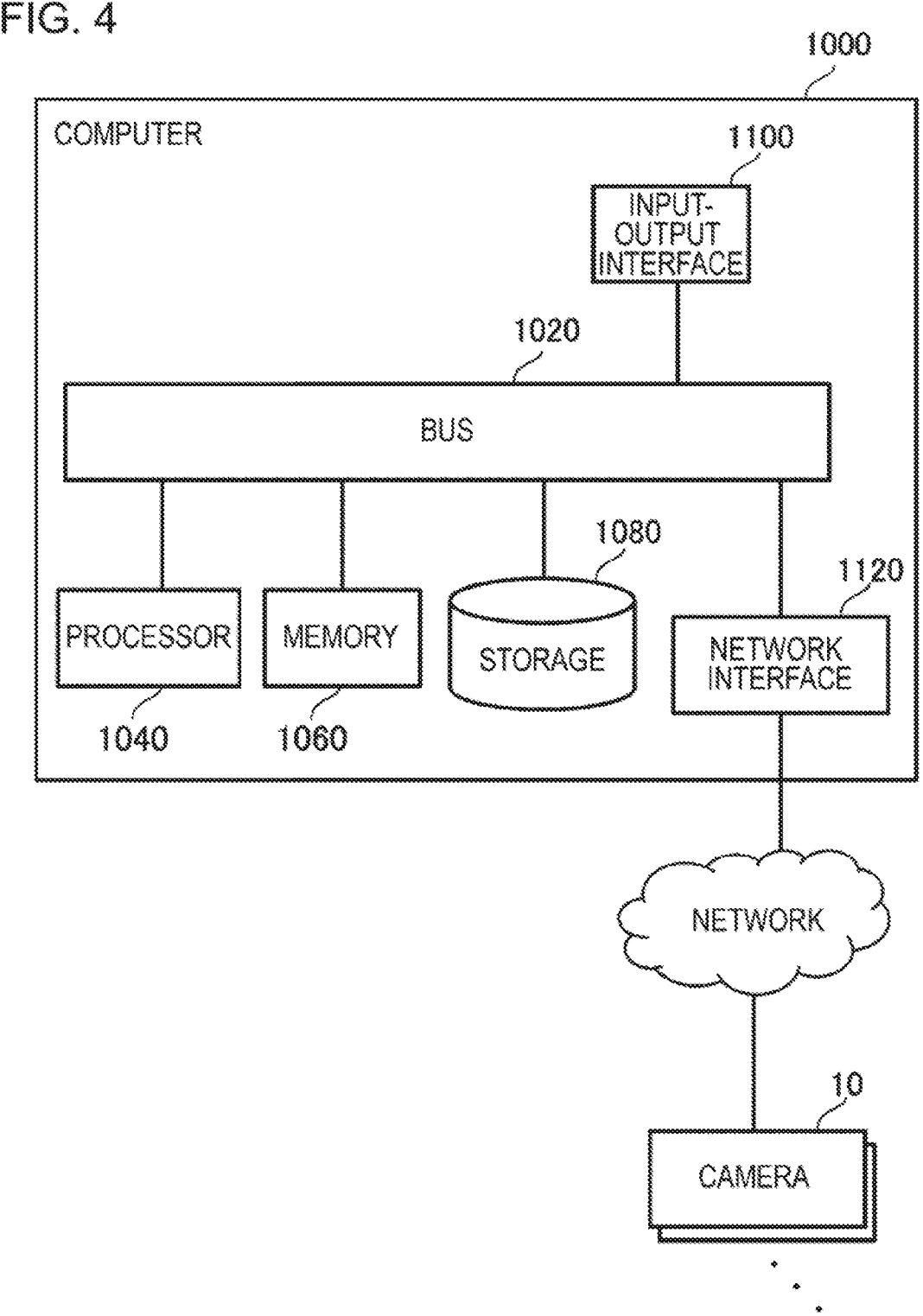
FIG. 4 is a diagram illustrating a computer which is used to realize the information processing apparatus.

FIG. 4 is a diagram illustrating a computer 1000 which is used to realize the information processing apparatus 2000. The computer 1000 is an optional computer. For example, the computer 1000 includes a Personal Computer (PC), a server machine, a tablet terminal, a smartphone, or the like. In another example, the computer 1000 may be the camera 10 which generates the captured image 12. The computer 1000 may be a dedicated computer, which is designed to realize the information processing apparatus 2000, or a general-purpose computer.

The computer 1000 includes a bus 1020, a processor 1040, a memory 1060, a storage 1080, an input-output interface 1100, and a network interface 1120. The bus 1020 is a data transmission line which is used for the processor 1040, the memory 1060, the storage 1080, the input-output interface 1100, and the network interface 1120 to transmit and receive data to and from each other. However, a method for connecting the processor 1040 and the like to each other is not limited to bus connection. The processor 1040 is an arithmetic unit such as a Central Processing Unit (CPU) or a Graphics Processing Unit (GPU). The memory 1060 is a main memory unit which is realized using a Random Access Memory (RAM) or the like. The storage device 1080 is an auxiliary storage unit which is realized using a hard disk, a Solid State Drive (SSD), a memory card, a Read Only Memory (ROM), or the like. However, the storage device 1080 may include hardware which is the same as hardware, such as the RAM, included in the main memory unit.

The input-output interface 1100 is an interface which is used to connect the computer 1000 to an input-output device. The network interface 1120 is an interface which is used to connect the computer 1000 to a communication network. The communication network is, for example, a Local Area Network (LAN) or a Wide Area Network (WAN). A method for connecting to the communication network by the network interface 1120 may be wireless connection or wired connection.

For example, the computer 1000 is communicably connected to the camera 10 through the network. However, a method for communicably connecting the computer 1000 to the camera 10 is not limited to connection through the network. In addition, the computer 1000 may not be communicably connected to the camera 10.

The storage 1080 stores program modules which are used to realize the respective functional configuration units (the determination unit 2020 and the warning unit 2040) of the information processing apparatus 2000. The processor 1040 realizes functions corresponding to the respective program modules by reading and executing the respective program modules in the memory 1060.

<Camera 10>

The camera 10 is an arbitrary camera which is capable of generating the plurality of captured images 12 by repeatedly performing imaging. The camera 10 may be a video camera which generates the video data or may be a still camera which generates still image data. Note that, in a former case, the captured images 12 are frames included in the video data.

The camera 10 may be a 2-dimensional camera or a 3-dimensional camera (depth camera).

As described above, the computer 1000, which realizes the information processing apparatus 2000, may be the camera 10. In this case, the camera 10 analyzes the captured images which are generated by the camera 10, and outputs the warning when the first foreground area 13 does not represent the moving object. As the camera 10 into which the above-described functions are installed, for example, it is possible to use so-called intelligent camera, network camera, or Internet Protocol (IP) camera.

<Flow of Process>

Figure 5A:
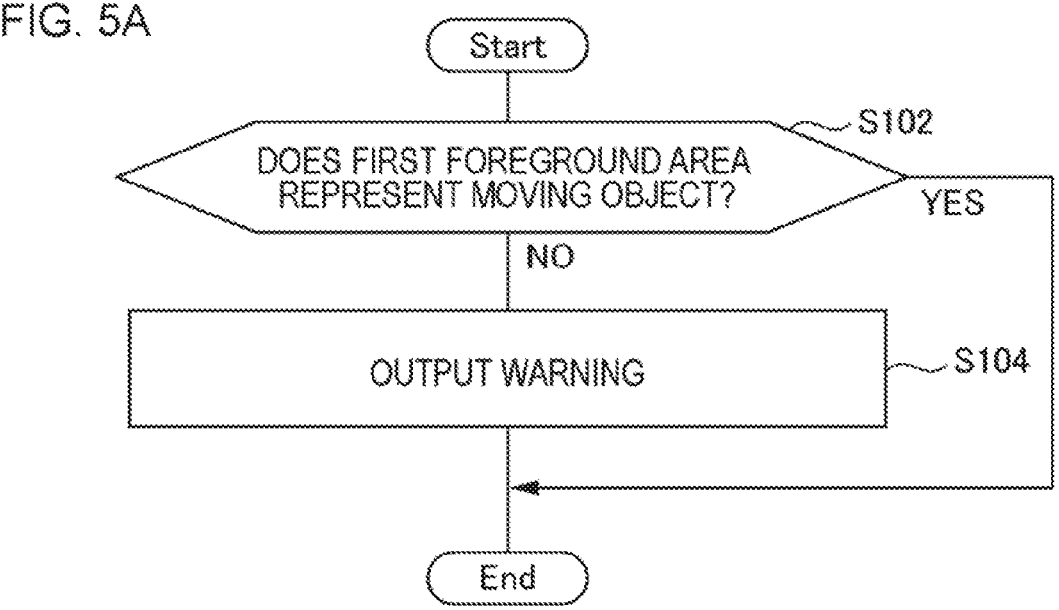
FIG. 5 are flowcharts illustrating a flow of a process executed by the information processing apparatus according to the first example embodiment.

FIG. 5 are flowcharts illustrating a flow of a process executed by the information processing apparatus 2000 according to the first example embodiment. FIG. 5A illustrates an outline of the flow of the process. The determination unit 2020 determines whether or not the first foreground area 13 represents the moving object (S102). When the first foreground area 13 represents the moving object (S102: YES), the process of FIG. 5 ends. On the other hand, when the first foreground area 13 does not represent the moving object (S102: NO), the warning unit 2040 outputs the warning (S104).

Figure 5B:
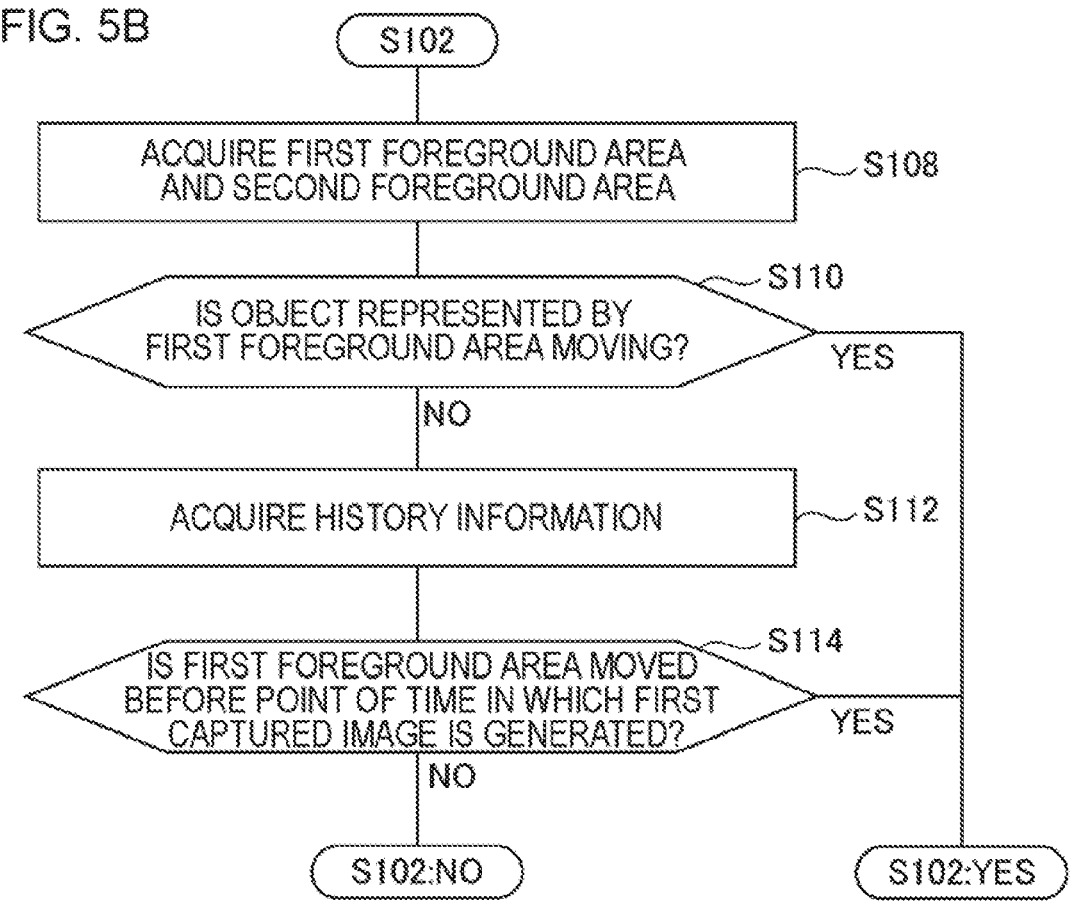

FIG. 5B illustrates details of the flow of the process executed in S102. The determination unit 2020 acquires the first foreground area 13 and the second foreground area 14 (S108). The determination unit 2020 performs the first determination using the acquired first foreground area 13 and the second foreground area 14 (S110). Specifically, the determination unit 2020 compares the first foreground area 13 with the second foreground area 14 and determines whether or not the object represented by the first foreground area 13 is moving. When it is determined that the object represented by the first foreground area 13 is moving (S110: YES), a result of the decision performed by the determination unit 2020 is "the first foreground area 13 represents the moving object (S102: YES)". Thus, the warning is not output.

On the other hand, when it is determined that the object represented by the first foreground area 13 is not moving (S110: NO), the determination unit 2020 acquires the history information for the object which is represented by the first foreground area 13 (S112).

The determination unit 2020 performs the second determination using the acquired history information (S114). Specifically, the determination unit 2020 determines whether or not the first foreground area 13, which is extracted from the first captured image 12, moved before the time at which the first captured image 12 is generated. When it is determined to have moved (S114: YES), a result of the determination performed by the determination unit 2020 is "the first foreground area 13 represents the moving object (S102: YES)". Thus, the warning is not output.

On the other hand, when it is determined to have not moved (S114: NO), the result of the determination performed by the determination unit 2020 is "the first foreground area 13 does not represent the moving object (S102: NO)". Thus, the warning is output (S104).

<Timing at which Information Processing Apparatus 2000 Executes Process>

There are various timings at which the information processing apparatus 2000 executes a series of processes illustrated in FIG. 5. For example, the information processing apparatus 2000 executes the series of processes illustrated in FIG. 5 by handling the captured image 12 as the first captured image 12 whenever the captured image 12 is generated by the camera 10.

In another example, the information processing apparatus 2000 executes the series of processes illustrated in FIG. 5 at predetermined time intervals (for example, at every second). In this case, for example, the information processing apparatus 2000 acquires the latest captured image 12 generated by the camera 10 at a timing in which the series of processes illustrated in FIG. 5 start.

<Acquisition of First Foreground Area 13 and Second Foreground Area 14: S102>

The determination unit 2020 acquires the first foreground area 13 and the second foreground area 14 (S108). As described above, the foreground area is extracted by taking the difference between the captured image 12 and the background image 11. Accordingly, the first foreground area 13 is extracted by taking the difference between the first captured image 12 and the background image 11. In addition, the second foreground area 14 is extracted by taking the difference between the second captured image 12 and the background image 11.

A process for extracting the first foreground area 13 and the second foreground area 14 from the captured image 12 may be performed by the information processing apparatus 2000 or may be performed by an apparatus other than the information processing apparatus 2000. In a former case, the determination unit 2020 acquires the first captured image 12, the second captured image 12, and the background image 11. Furthermore, the determination unit 2020 extracts the first foreground area 13 using the first captured image 12 and the background image 11, and extracts the second foreground area 14 using the second captured image 12 and the background image 11. Note that, it is possible to use a well-known technique as a technique for extracting the foreground area by acquiring a difference between a certain image and the background image 11. The background image 11 used to extract the first foreground area 13 and the background image 11 used to extract the second foreground area 14 may be the same image or may be different images.

Here, a method for acquiring the captured image 12 by the determination unit 2020 is optional. For example, the determination unit 2020 receives the captured image 12 which is transmitted from the camera 10. In another example, the determination unit 2020 accesses the camera 10, and acquires the captured image 12 stored in the camera 10.

Note that, the camera 10 may store the captured image 12 in a storage unit which is provided on the outside of the camera 10. In this case, the determination unit 2020 accesses the storage unit and acquires the captured image 12.

When the information processing apparatus 2000 is realized by the camera 10, the information processing apparatus 2000 acquires the captured image 12 which is generated by the information processing apparatus 2000 itself. In this case, the captured image 12 is stored in, for example, the memory 1060 or the storage device 1080 (See FIG. 4) inside the information processing apparatus 2000. Here, the determination unit 2020 acquires the captured image 12 from the memory 1060 or the storage device 1080.

<Background Image 11>

As described above, the background image 11 is used to extract the foreground area. For example, one of the captured images 12 generated by the camera 10 is used as the background image 11. A well-known technique may be used as a method for deciding the background image 11 which is used to extract the foreground area. Details of the method for deciding the background image 11 will be described in the embodiment which will be described later.

<Surveillance Area>

Extraction of the foreground area may be performed for all areas in the captured image 12 or may be performed for partial areas in the captured image 12. In a latter case, an area being a target of the extraction of the foreground area is called a surveillance area. When the surveillance area is defined in the captured image 12, the determination unit 2020 extracts the foreground area by comparing the surveillance area in the captured image 12 and a surveillance area in the background image 11.

When the surveillance area is set as described above, it is possible to exclude areas other than ones to be surveilled from an image processing target among areas in the captured image 12. Accordingly, it is possible to reduce calculation costs which are demanded for the image processing. For example, when a product is stolen from the product shelf and it is desired to output the warning, an area representing the product shelf is set to the surveillance area among the areas in the captured image 12. In this manner, it is possible to exclude areas other than the product shelf be surveilled from the image processing target among the areas which are included in the captured image 12.

There are various methods for defining a location of the surveillance area in the captured image 12. For example, the location of the surveillance area in the captured image 12 is defined in advance using coordinates on the captured image 12. For example, when the surveillance area has a rectangular shape, coordinates of an upper-left vertex of the surveillance area and coordinates of a lower-right vertex of the surveillance area are defined. When the surveillance area has a polygonal shape other than the rectangular shape, for example, coordinates of each of the vertexes of the surveillance area are defined.

In another example, the surveillance area may be defined using a location of a surveillance target in a real world. In this case, the information processing apparatus 2000 converts the location of the surveillance target in the real world into a location on the captured image 12. It is possible to realize a process for converting the location on the real world into the location on the captured image using camera parameters (an installation location, an imaging direction, an angle of view, and the like) of the camera which generates the captured image. Note that, it is possible to use a well-known technique as the process for converting the location of the real world into the location on the captured image using the camera parameters.

<First Decision: S110>

The determination unit 2020 performs the first determination using the first foreground area 13 and the second foreground area 14 (S110). Specifically, the determination unit 2020 compares the first foreground area 13 with the second foreground area 14, and determines whether or not the object represented by the first foreground area 13 is moving. There are various detailed methods for determination. Hereinafter, the determination method is illustrated.

<<First Example of Determination Method>>

The determination unit 2020 compares the first foreground area 13 with the second foreground area 14, and computes optical flow of the first foreground area 13.

Furthermore, when a size of the optical flow of the first foreground area 13 is equal to or larger than a predetermined value, the determination unit 2020 determines that the object represented by the first foreground area 13 is moving. On the other hand, when the size of the optical flow of the first foreground area 13 is less than the predetermined value, the determination unit 2020 determines that the object represented by the first foreground area 13 is not moving. It is possible to compute the size of the optical flow of the first foreground area 13 as, for example, a statistical value (an average value, a mode value, a maximum value, a minimum value, or the like) of sizes of a plurality of vectors which represent the optical flow of the first foreground area 13.

<<Second Example of Determination Method>>

The determination unit 2020 computes a distance between the first foreground area 13 and the second foreground area 14. Furthermore, when the computed distance is equal to or larger than a predetermined value, the determination unit 2020 determines that the object represented by the first foreground area 13 is moving. On the other hand, when the computed distance is less than the predetermined value, the determination unit 2020 determines that the object represented by the first foreground area 13 is not moving. The distance between the first foreground area 13 and the second foreground area 14 is defined as, for example, a distance between a center of the first foreground area 13 and a center of the second foreground area 14.

<<Third Example of Determination Method>>

The determination unit 2020 computes a dimension of a part where the first foreground area 13 overlaps the second foreground area 14. Furthermore, the determination unit 2020 determines whether or not the object represented by the first foreground area 13 is moving based on a size of the computed dimension. For example, when a ratio of the computed dimension to a dimension of the first foreground area 13 is less than a predetermined value, the determination unit 2020 determines that the object represented by the first foreground area 13 is moving. On the other hand, when the ratio of the computed dimension to the dimension of the first foreground area 13 is larger than the predetermined value, the determination unit 2020 determines that the object represented by the first foreground area 13 is not moving. Here, the determination unit 2020 may use a ratio of the computed dimension to a dimension of the second foreground area 14 instead of the ratio of the computed dimension to the dimension of the first foreground area 13.

Note that, the respective predetermined values which are used for the determination may be set in the determination unit 2020 in advance or may be stored in the storage unit which can be accessed by the determination unit 2020.

<Second Determination: S112 and S114>

The determination unit 2020 acquires the history information for the object represented by the first foreground area 13 (S112), and performs the second determination using the history information (S114). Specifically, the determination unit 2020 determines whether or not the object represented by the first foreground area 13 was moving in the past (before the time in which the first captured image 12 is generated) using the history information.

The history information of an object indicates information of the object at time in the past (time before the time in which the first captured image 12 is generated). For example, the history information acquired for the object represented by the first foreground area 13 indicates information of the object acquired before the time in which the first captured image 12 is generated. The history information of an object is acquired by analyzing, for example, the plurality of captured images 12 included in the foreground area which represents the object. A method for generating the history information will be described in detail later.

The history information indicates various pieces of detailed information. For example, the history information of an object represents a history of the optical flow which is computed for the foreground area that represents the object extracted from each of the plurality of captured images 12. In this case, for example, the determination unit 2020 computes a sum by summing up the history of the optical flow indicated through the history information, performs the second determination by deciding whether or not the sum is equal to or larger than the predetermined value. When the sum of the optical flow is equal to or larger than the predetermined value, the determination unit 2020 determines that the object represented by the first foreground area 13 was moving before the time in which the first captured image 12 is generated (S114: YES). On the other hand, when the sum of the optical flow is less than the predetermined value, the determination unit 2020 determines that the object represented by the first foreground area 13 was not moving before the time in which the first captured image 12 is generated (S114: NO).

In another example, the history information of an object indicates a result of estimation of whether or not the object is the moving object, the estimation being performed using the foreground area that represents the object extracted from each of the plurality of captured images 12. When the history information shows "the object is a moving object" as the result of the estimation, the determination unit 2020 determines that the object represented by the first foreground area 13 was moving before the time in which the first captured image 12 is generated (S114: YES). On the other hand, when the history information shows "the object is not a moving object" as the result of the estimation, the determination unit 2020 determines that the object represented by the first foreground area 13 was not moving before the time in which the first captured image 12 is generated (S114: YES).

<Method for Generating History Information>

Figure 6:
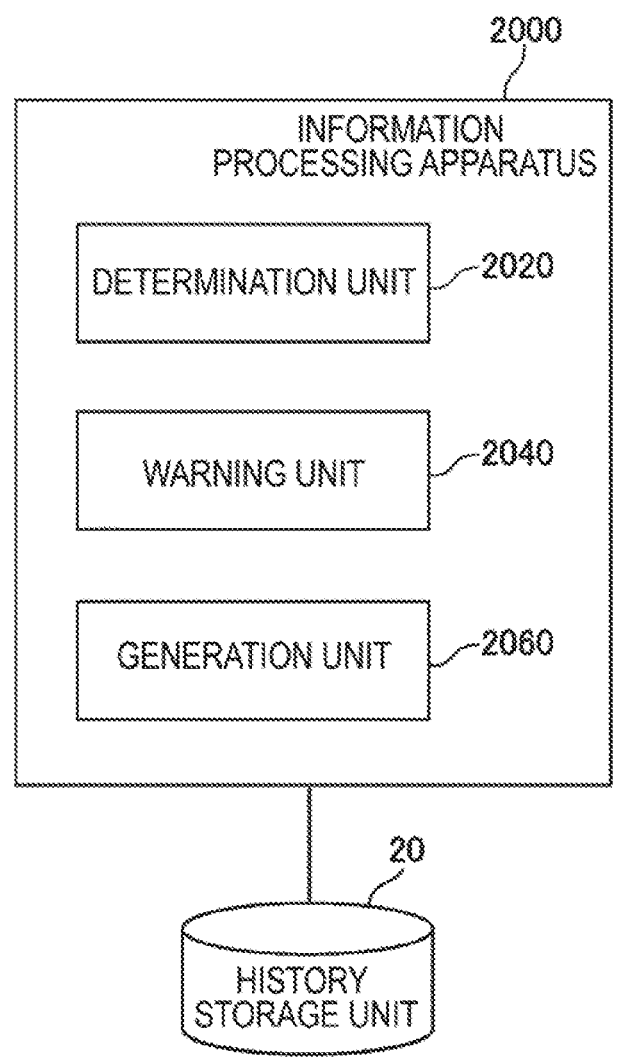
FIG. 6 is a block diagram illustrating the information processing apparatus which includes a generation unit.

Hereinafter, a method for generating the history information will be described. A functional configuration unit, which generates the history information, is called a generation unit 2060. FIG. 6 is a block diagram illustrating the information processing apparatus 2000 which includes the generation unit 2060.

When the history information indicates the history of the optical flow, for example, the generation unit 2060 uses the optical flow computed in a procedure of the first determination performed by the determination unit 2020. That is, when the determination unit 2020 computes the optical flow of the object represented by the first foreground area 13 using the first foreground area 13 and the second foreground area 14, the generation unit 2060 inserts the computed optical flow into the history information of the object.

When the history information indicates the result of the estimation of whether or not there is a moving object, the history information is generated, for example, as below. First, the generation unit 2060 determines whether or not the object which is represented by the foreground areas is moving for the foreground areas which are respectively extracted from the plurality of captured images 12 and which represent the same object. Furthermore, the generation unit 2060 determines whether or not the object represented by the foreground areas is the moving object, based on a result of the determination for the respective foreground areas. Furthermore, the generation unit 2060 handles the result of the determination as the result of the estimation indicated by the history information.

Hereinafter, two detailed examples of a flow of a process executed by the generation unit 2060 will be described.

First Example

Figure 7:
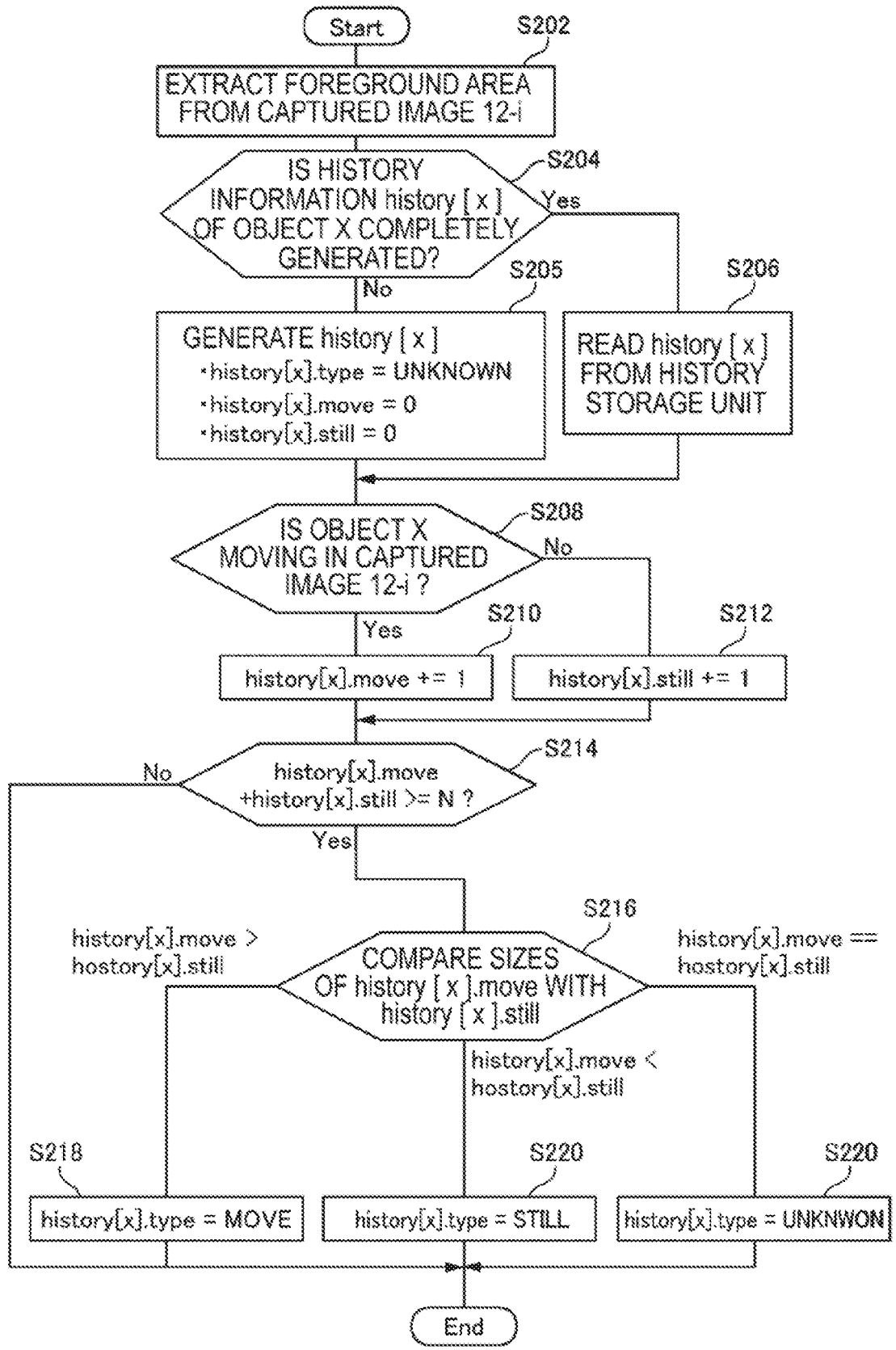
FIG. 7 is a flowchart illustrating a flow of a process executed by the generation unit according to a first example.

FIG. 7 is a flowchart illustrating the flow of the process executed by the generation unit 2060 according to a first example. The process of FIG. 7 represents a flow in which an i-th captured image 12 (hereinafter, a captured image 12-$i$) generated by the camera 10 is processed.

The generation unit 2060 extracts a foreground area from the captured image 12-$i$ (S202). An object represented by the foreground area extracted here will be called object X.

The generation unit 2060 determines whether or not history information of the object X is already generated (S204). Hereinafter, the history information of the object X is represented by "history[x]". In addition, it is assumed that the history information of the object X includes three attributes: "history[x].type" representing a type of the object X; "history[x].move" representing the number of times that the object X is determined to be moving; and "history[x] .still" representing the number of times that the object X is determined to be not moving.

A value to be set to type is any one of: a constant value UNKNOWN representing that the type of the object is not determined yet; a constant value MOVING representing that the type of the object is determined to be the moving object; a constant value STILL representing that the type of the object is determined to be the motionless object; and a constant value PENDING representing that the type of the object is determined to be not clear. The value of the type is handled as the result of the estimation indicated by the history information. For example, a value of type MOVING means the result of the estimation that "the foreground area represents the moving object". In addition, a value of type STILL means the result of the estimation that "the foreground area does not represent the moving object"

When the history information of the object X is already generated (S204: YES), the generation unit 2060 reads the history information of the object X from the history storage unit 20. On the other hand, when the history information of the object X is not generated yet (S204: NO), the generation unit 2060 generates the history information of the object X (S206). At this time, the type is initialized to UNKNOWN. In addition, both the types move and still are initialized to 0. Then, the process of FIG. 7 proceeds to S208.

The generation unit 2060 determines whether or not the object X is moving in the captured image 12-$i$ (S208). The determination method is the same as, for example, the method for determining whether or not the object represented by the first foreground area 13 is moving by comparing the first foreground area 13 with the second foreground area 14. In this case, for example, the generation unit 2060 determines whether or not the object X represented by the first foreground area extracted from the captured image 12-$i$ is moving by comparing the foreground area extracted from the captured image 12-$i$ with a foreground area extracted from a captured image 12-[$i$-1].

When the object X is determined to be moving (S208: YES), the generation unit 2060 adds 1 to "history[X].move" (S210). On the other hand, when the object X is determined to be not moving (S208: NO), the generation unit 2060 adds 1 to "history[x].still" (S212).

The generation unit 2060 determines whether or not the number of times that the foreground area representing the object X is extracted from the captured image 12 so far ("history[x].move"+"history[x].still") is equal to or larger than a predetermined value N (S214). The predetermined value N represents the minimum number of captured images 12 including the object X that is necessary to estimate whether or not the object X is the moving object. When the number of times that the foreground area representing the object X is extracted from the captured image 12 is less than N (S214: NO), the process of FIG. 7 ends. In this case, the type of the history information of the object X becomes UNKNOWN.

When the number of times that the foreground area representing the object X is extracted from the captured image 12 is equal to or larger than N (S214: YES), the generation unit 2060 compares the number of times that the object X is determined to be moving ("history[x].move") with the number of times that the object X is determined to be not moving ("history[x].still"). When the number of times that the object X is determined to be moving is larger ("history[x].move">"history[x].still"), the generation unit 2060 sets the type of the history information of the object X as MOVING (S218). That is, the result of the estimation that "the foreground area represents the moving object" is set to the history information.

When the number of times that the object X is determined to be not moving is larger ("history[x].move"<"history[x] .still"), the generation unit 2060 sets the type of the history information of the object X as STILL (S220). That is, the result of the estimation that "the foreground area does not represent the moving object" is set to the history information.

When the number of times that the object X is determined to be moving is the same as the number of times that the object X is determined to be not moving ("history[x] .move"="history[x].still"), the generation unit 2060 sets the type of the history information of the object X as PENDING (S222).

Note that, the process illustrated in FIG. 7 is an example of the method for generating the history information, and the method for generating the history information is not limited to the process illustrated in FIG. 7.

The generation unit 2060 stores the generated or updated history information in the history storage unit 20. It is possible to use an optional storage unit as the history storage unit 20. In addition, the history storage unit 20 may be installed inside the information processing apparatus 2000 or may be installed on the outside of the information processing apparatus 2000.

Second Example

Figure 8:
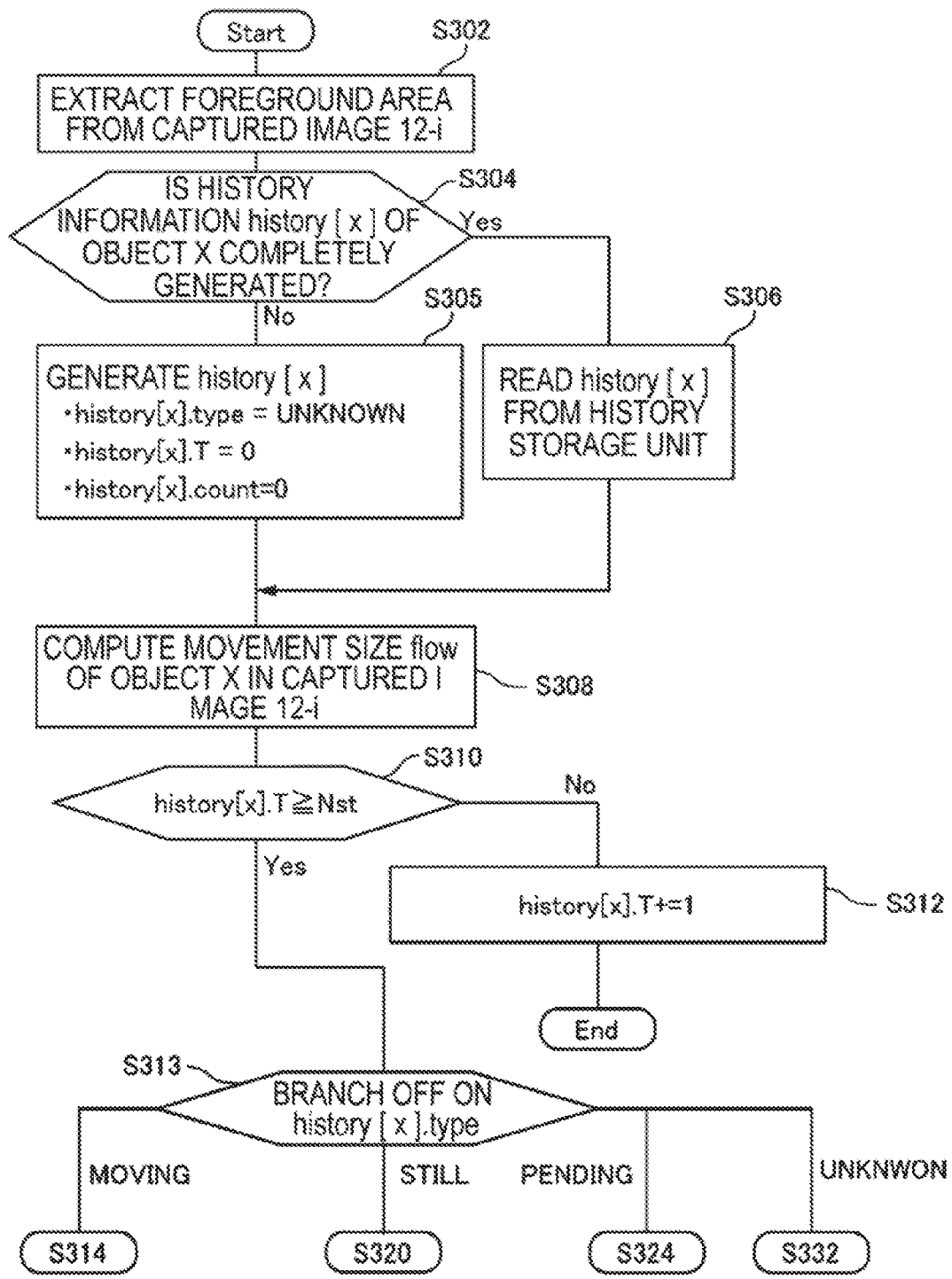
FIG. 8 is a flowchart illustrating a flow of a process executed by the generation unit according to a second example.
Figure 9:
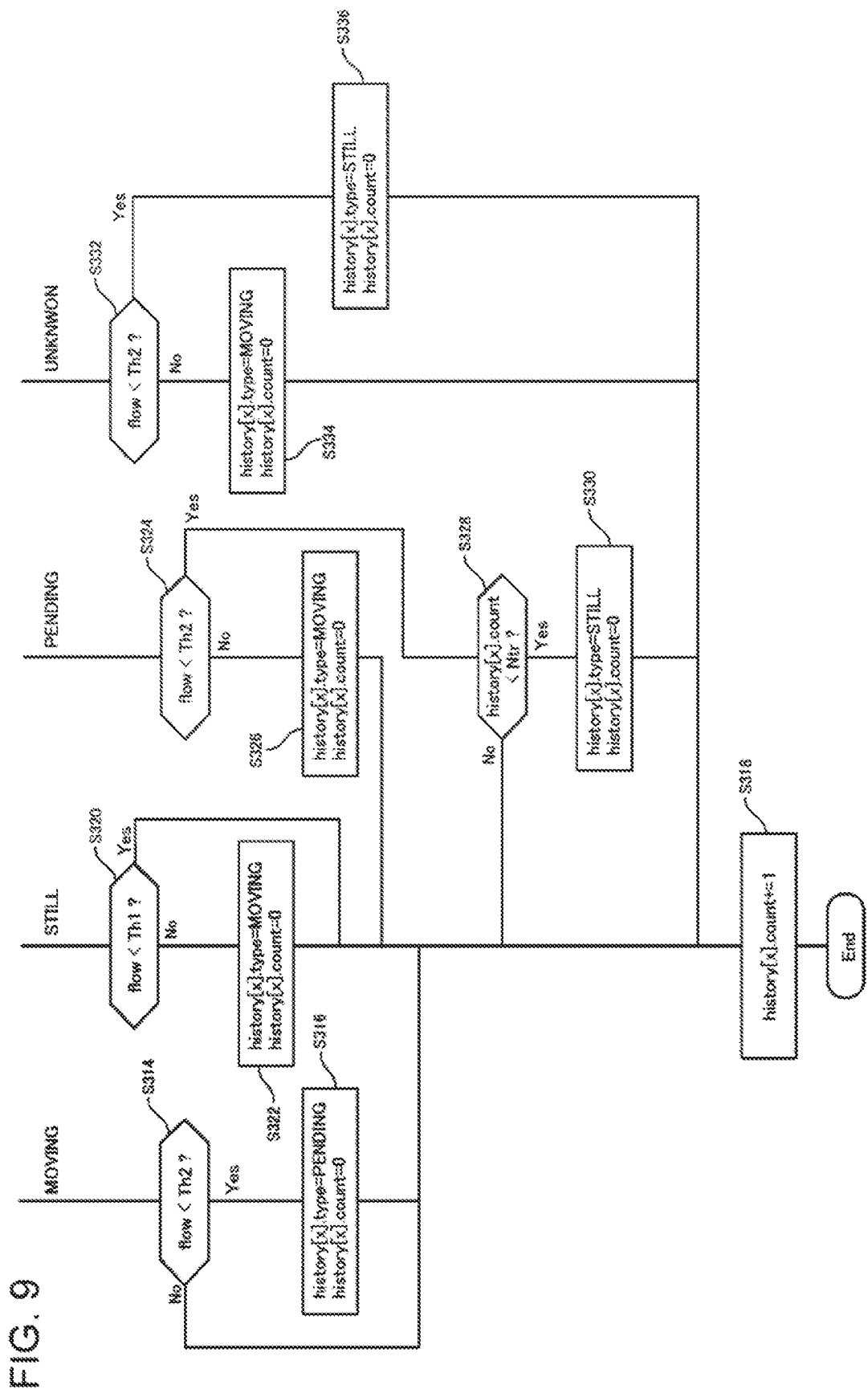
FIG. 9 is a flowchart illustrating the flow of the process executed by the generation unit according to the second example.

FIGS. 8 and 9 are flowcharts illustrating a flow of the process executed by the generation unit 2060 according to the second example. FIGS. 8 and 9 represent the flow in which the captured image 12-$i$ is processed as the same as in FIG. 7.

The generation unit 2060 extracts the foreground area from the captured image 12-$i$ (S302). An object represented by the foreground area extracted here is called object X. The generation unit 2060 determines whether or not the history information (hereinafter, "history[x]") of the object X is already generated (S304).

When the history information of the object X is already generated (S304: YES), the generation unit 2060 reads the history information of the object X from the history storage unit 20 (S306). On the other hand, when the history information of the object X is not generated yet (S304: NO), the generation unit 2060 generates the history information of the object X (S305).

The history information in the cases of FIGS. 8 and 9 includes elements "T" and "count" in addition to "type". "T" is a variable used to count the number of captured images 12 from which the object X is extracted. The "count" is a variable used to count the number of times that a state of the object X is subsequently determined to be PENDING.

The generation unit 2060 computes a movement size "flow" of the object X in the captured image 12-*i* (S308). For example, the generation unit 2060 computes an optical flow of the object X using the foreground area which represents the object X in the captured image 12-*i* and the foreground area which represents the object X in the captured image 12-[*i*-1]. Furthermore, the generation unit 2060 sets the size of the optical flow to a value of "flow".

The generation unit 2060 determines whether or not "history[x].T" is equal to or larger than a constant value Nst (S310). When "history[x].T" is not equal to or larger than Nst (S310: NO), the generation unit 2060 adds 1 to "history[x].T" (S312), and ends the process of FIG. 8.

When "history[x].T" is equal to or larger than Nst (S310: YES), the process of FIG. 8 branches off based on a value of "history[x].type" (S313). When "history[x].type" is MOVING (S313: MOVING), the process of FIG. 8 proceeds to S314. When "history[x].type" is STILL (S313: STILL), the process of FIG. 8 proceeds to S320. When "history[x].type" is PENDING (S313: PENDING), the process of FIG. 8 proceeds to S324. When "history[x].type" is UNKNOWN (S313: UNKNOWN), the process of FIG. 8 proceeds to S332.

Respective processes subsequent to the above branch are illustrated in FIG. 9. Hereinafter, FIG. 9 will be described.

When "history[x].type" is MOVING in S313, the generation unit 2060 determines whether or not the movement size of the object X is less than a constant value Th2 (S314). When the movement size of the object X is less than Th2 (S314: YES), the generation unit 2060 sets "history[x].type" as PENDING, and sets "history[x].count" as 0 (S316). Thereafter, the generation unit 2060 adds 1 to "history[x].count" (S318), and ends the process of FIG. 9.

When the movement size of the object X is not less than Th2 (S314: NO), the generation unit 2060 adds 1 to "history[x].count" (S318), and ends the process of FIG. 9.

When "history[x].type" is STILL in S313, the generation unit 2060 determines whether or not the movement size of the object X is less than a constant value Th1 (S320). When the movement size of the object X is less than Th1 (S320: YES), the generation unit 2060 adds 1 to "history[x].count" (S318), and ends the process of FIG. 9. On the other hand, when the movement size of the object X is not less than Th1 (S320: NO), the generation unit 2060 sets "history[x].type" as MOVING, and sets "history[x].count" as 0 (S322). Thereafter, the generation unit 2060 adds 1 to "history[x].count" (S318), and ends the process of FIG. 9.

When "history[x].type" is PENDING in S313, the generation unit 2060 determines whether or not the movement size of the object X is less than Th2 (S324). When the movement size of the object X is less than the constant value Th2 (S324: YES), the generation unit 2060 determines whether or not "history[x].count" is less than a constant value Ntr (S328).

When "history[x].count" is less than Ntr (S328: YES), the generation unit 2060 sets "history[x].type" as STILL, and sets "history[x].count" as 0 (S330). Thereafter, the generation unit 2060 adds 1 to "history[x].count" (S318), and ends the process of FIG. 9. On the other hand, when "history[x].count" is not less than Ntr (S328: NO), the generation unit 2060 adds 1 to "history[x].count" (S318), and ends the process of FIG. 9.

When the movement size of the object X is not less than Th2 in S324 (S324: NO), the generation unit 2060 sets "history[x].type" as MOVING, and sets "history[x].count" as 0 (S326). Thereafter, the generation unit 2060 adds 1 to "history[x].count" (S318), and ends the process of FIG. 9.

When "history[x].type" is UNKNWON in S313, the generation unit 2060 determines whether or not the movement size of the object X is less than Th2 (S332). When the movement size of the object X is less than Th2 (S332: YES), the generation unit 2060 sets "history[x].type" as STILL, and sets "history[x].count" as 0 (S336). Thereafter, the generation unit 2060 adds 1 to "history[x].count" (S318), and ends the process of FIG. 9.

On the other hand, when the movement size of the object X is not less than Th2 in S332 (S332: NO), the generation unit 2060 sets "history[x].type" as MOVING, and sets "history[x].count" as 0 (S334). Thereafter, the generation unit 2060 adds 1 to "history[x].count" (S318), and ends the process of FIG. 9.

<<Identification of Foreground Area>>

In order to generate and acquire the history information for the object which is represented by the foreground areas extracted from the captured images 12, it is necessary to determine the foreground areas which represent the same object as each other and which are extracted from the plurality of respective captured images 12. Hereinafter, an operation of determining the foreground areas which represent the same object is called "identification of the foreground areas". It is possible to use various existing technologies for the identification of the foreground areas.

For example, the information processing apparatus 2000 performs the identification of the foreground areas by tracking the foreground areas extracted from the plurality of captured images 12 which are generated in time series. Furthermore, a common Identifier (ID) is assigned to the foreground areas which represent the same object. This ID is called object ID. The object ID of the object is associated with the history information of the certain object.

The determination unit 2020 determines the object ID of the object represented by the first foreground area 13 that is extracted from the first captured image 12, by performing the identification of the foreground areas using, for example, tracking information or the like. Furthermore, the determination unit 2020 acquires the history information associated with the object ID from the history storage unit 20. When the generation unit 2060 acquires or generates the history information, the generation unit 2060 determines the object ID of the object represented by the foreground areas extracted from the captured images 12, in the same manner.

<Output of Warning: S104>

When the object represented by the first foreground area 13 is determined to be not the moving object (S102: NO), the warning unit 2040 outputs the warning (S104). Here, there are various methods for outputting the warning by the warning unit 2040. For example, the warning unit 2040 outputs the warning from an output device which is connected to the information processing apparatus 2000. The output device includes, for example, a display device, a speaker, and the like.

Figure 10:
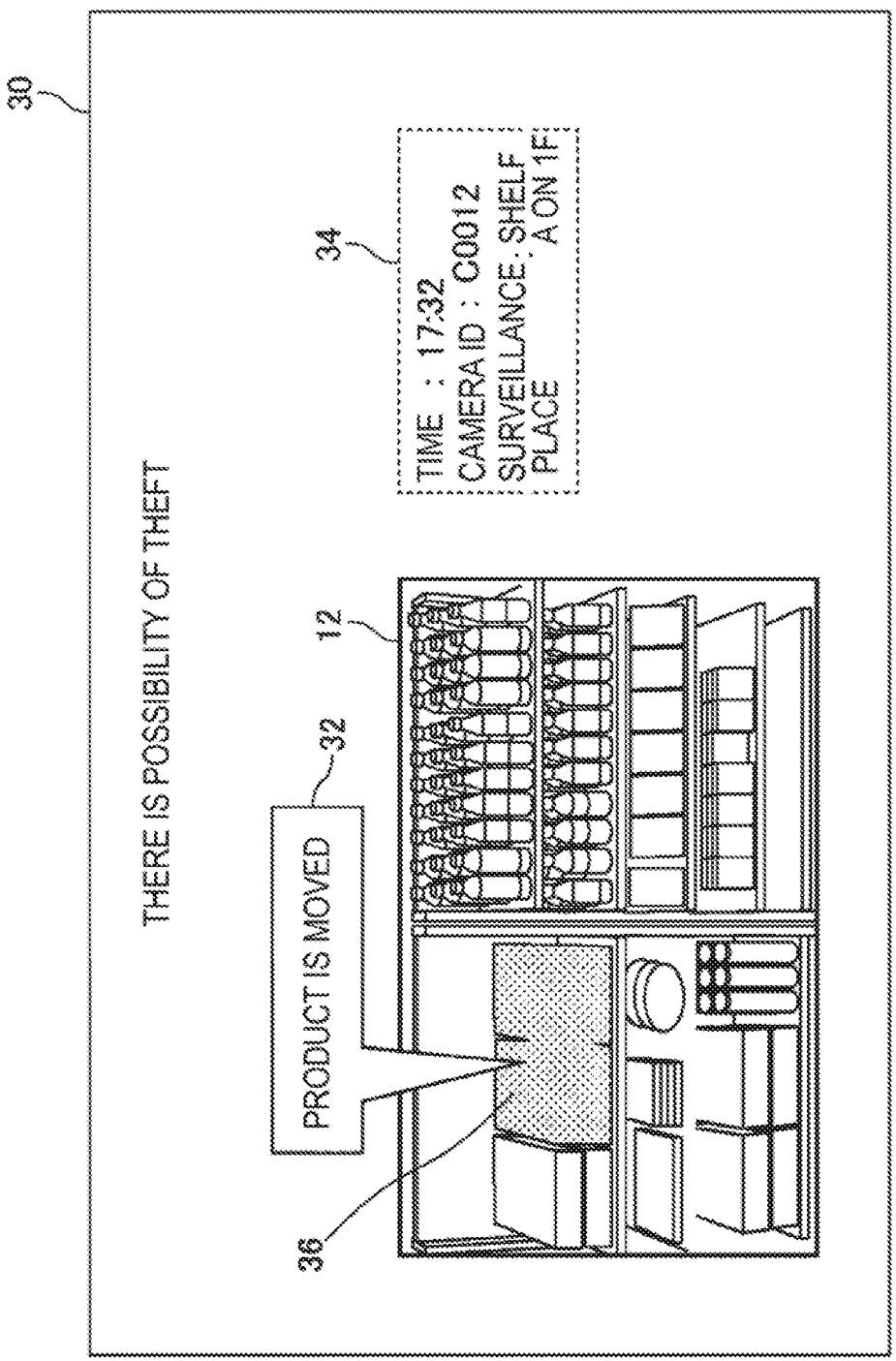
FIG. 10 is a diagram illustrating a warning screen which is displayed on a display device.

FIG. 10 is a diagram illustrating a warning screen 30 which is displayed on the display device. In the warning screen 30, the first captured image 12 for which it is determined that the first foreground area 13 does not represent the moving object is displayed. An area 36 represents the first foreground area 13 which is determined to not represent the moving object. The information 32 indicates a warning message. Information 34 indicates information related to the first captured image 12 for which it is determined that the first foreground area 13 does not represent the moving object. Specifically, the information 34 indicates the time at which the first captured image 12 is generated, an identifier of the camera 10 which generates the first captured images 12, and a location which is surveilled by the camera 10.

By watching the warning screen 30, it is possible for a sales clerk, an observer, or the like to easily recognize (1) a fact that there is a possibility that theft occurred and (2) when, where, and what object moved.

The warning output from the warning unit 2040 may be output to one or more mobile terminals. For example, the mobile terminal is a mobile terminal possessed by the sales clerk of the store, the security guard, or the like. The mobile terminal having acquired the warning output from the warning unit 2040 outputs the warning through a display device or a speaker of the mobile terminals. For example, a warning screen similar to that in FIG. 10 is output on the display device of the mobile terminal.

The warning output by the warning unit 2040 may include information that specifies the moving object (person or the like) expected to have moved a motionless object represented by the first foreground area 13. For example, the information processing apparatus 2000 determines, as the moving object expected to have moved a motionless object represented by the first foreground area 13, the foreground area that is other than the first foreground area 13 extracted from the captured image 12 for which it is determined that "the first foreground area 13 does not represent the moving object", that is the closest to the first foreground area 13, and that represents a moving object. The information that specifies the moving object includes, for example, an object ID assigned to the object or an image which represents the foreground area that represents the moving object. In this manner, when theft or the like occurs, it is possible to easily recognize a person who is a criminal in a high probability.

The warning unit 2040 may output the warning in response to that it is determined that "the first foreground area 13 does not represent the moving object" several times. More specifically, the warning unit 2040 outputs the warning when the determination result of "the first foreground areas 13 do not represent the moving object" is acquired several times through the process by the determination unit 2020 in which each of the plurality of captured images 12 from which the first foreground areas 13 representing the same object are extracted is handled as the first captured images 12.

Second Example Embodiment

Figure 11:
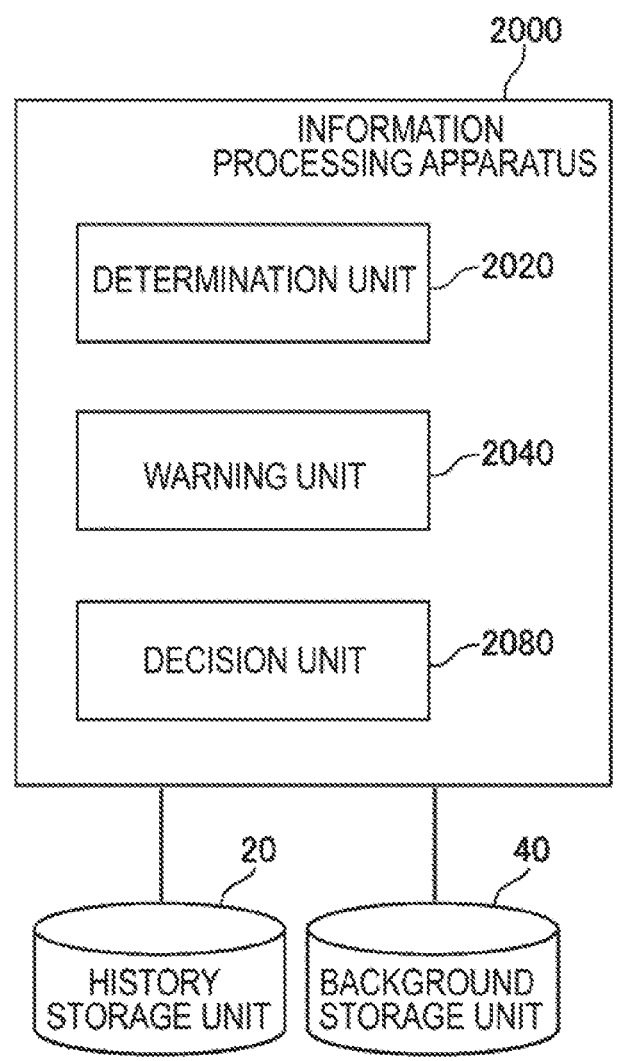
FIG. 11 is a block diagram illustrating an information processing apparatus according to a second example embodiment.

FIG. 11 is a block diagram illustrating an information processing apparatus 2000 according to the second example embodiment. The information processing apparatus 2000 according to the second example embodiment includes the same functions as the information processing apparatus 2000 according to the first example embodiment except matters which are described below.

The information processing apparatus 2000 according to the second example embodiment includes a decision unit 2080. The decision unit 2080 decides the background image 11. Furthermore, the decision unit 2080 writes information specifying the decided background image 11 into a background storage unit 40.

The information stored in the background storage unit 40 is arbitrary information capable of specifying the background image 11. For example, the decision unit 2080 writes image data of the background image 11 itself into the background storage unit 40. In another example, the decision unit 2080 may writes a path name representing a location where the background image 11 is stored into the background storage unit 40.

Hereinafter, a method in which the background image 11 is determined by the decision unit 2080 according to the second example embodiment will be described.

<Initialization of Background Image 11>

First, the decision unit 2080 initializes the background image 11 at a predetermined timing. The predetermined timing is, for example, a timing at which the information processing apparatus 2000 is turned on and the information processing apparatus 2000 performs various initial settings. In another example, the decision unit 2080 may initialize the background image 11 once a day in designated time. In addition, the decision unit 2080 may initialize the background image 11 in response to a user operation. Hereinafter, the background image 11 which is set through the initialization is called initial background image.

An image which is used as the initial background image is optional. For example, the decision unit 2080 sets the captured image 12 generated by the camera 10 at the predetermined timing as the initial background image. In another example, the decision unit 2080 may receive a specification of an image to be handled as the initial background image from the user.

<Update of Background Image 11>

The decision unit 2080 updates the background image 11 using a predetermined method after initializing the background image 11. Hereinafter, a method for updating the background image 11 will be described using some examples.

<<First Example of Update Method>>

Figure 12:
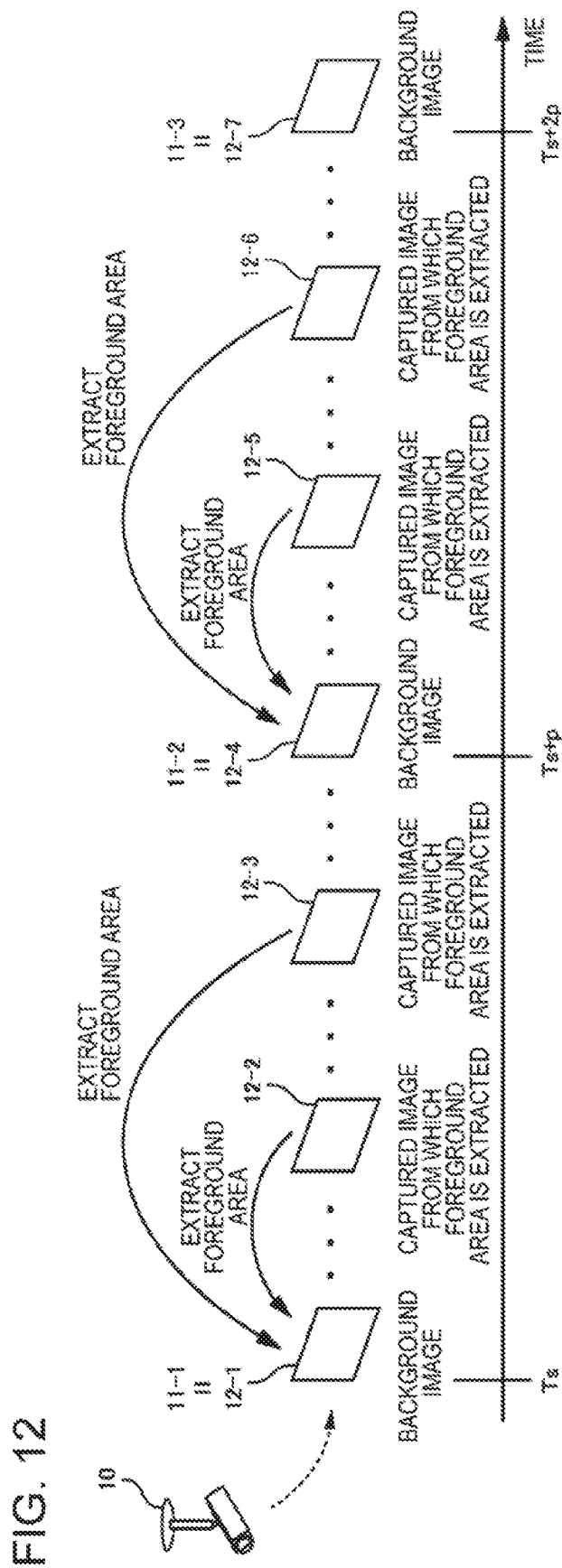
FIG. 12 is a diagram illustrating a case where a background image is updated at predetermined time intervals.

The decision unit 2080 updates the background image 11 at predetermined time intervals. FIG. 12 is a diagram illustrating a case where the background image 11 is updated at predetermined time intervals. In FIG. 12, the predetermined time interval is p. In addition, Ts is time at which the background image 11 is initialized. For this reason, the background image 11 is updated at each of the time Ts+p and the time Ts+2p.

For example, the decision unit 2080 updates the background image 11 in the captured image 12 which is the newest at the time when the update is performed. In FIG. 12, a captured image 12-4 generated at the time Ts+p becomes a new background image 11-2. In addition, a captured image 12-7 generated at the time Ts+2p becomes a new background image 11-3.

<<Second Example of Update Method>>

The decision unit 2080 updates the background image 11 using a captured image 12 generated after the time at which the captured image 12 for which it is determined that the first foreground area 13 does not represent the moving object is generated. As described above, when the first foreground area 13 does not represent the moving object, it is considered that the motionless object is moved (for example, the product is stolen). That is, a fact that the first foreground area 13 not representing the moving object is extracted means a fact that the background is changed. Thus, the decision unit 2080 updates the background image 11.

Figure 13:
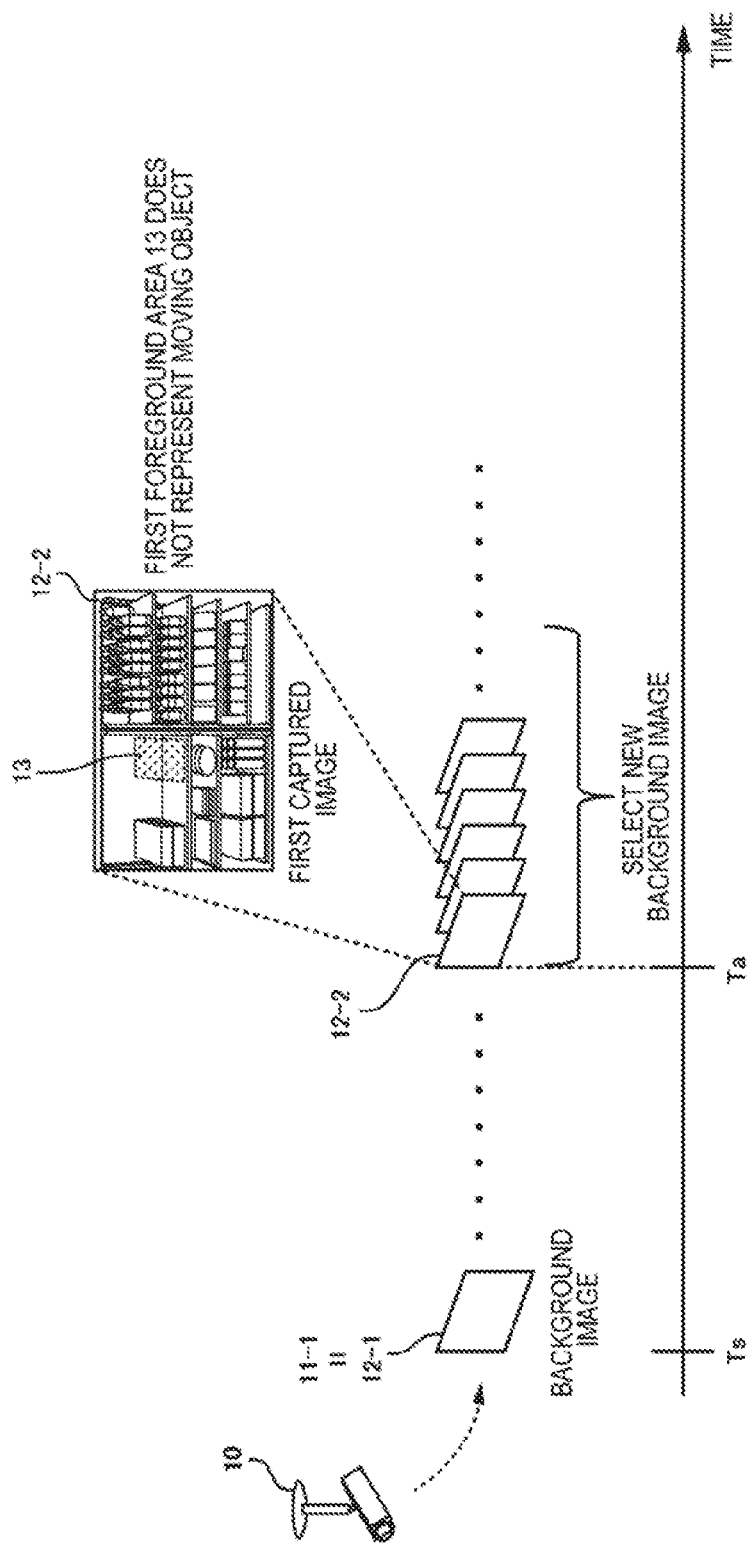
FIG. 13 is a diagram illustrating a method for updating the background image using a captured image generated after a time in which a captured image, in which it is determined that a first foreground area does not represent the moving object, is generated.

FIG. 13 is a diagram illustrating the method for updating the background image 11 using the captured image 12 generated after the time in which the captured image 12 for which it is determined that the first foreground area 13 does not represent the moving object is generated. In FIG. 13, it is determined that "the first foreground area 13 does not represent the moving object" in response to that the information processing apparatus 2000 performs a process while handling the captured image 12-2 generated at time Ta as the first captured image. Here, the decision unit 2080 updates the background image 11 using the captured image 12 generated after the time Ta.

It is optional which captured image 12 is handled as the background image 11 among the captured images 12 generated after the time when the captured image 12 for which it is determined that the first foreground area 13 does not represent the moving object is generated. For example, the decision unit 2080 handles the captured image 12 for which it is determined that the first foreground area 13 does not represent the moving object as the background image 11. In another example, the decision unit 2080 handles, as the background image 11, the captured image 12 that is generated the predetermined time or the predetermined frame after the captured image 12 for which it is determined that the first foreground area 13 does not represent the moving object.

However, it is preferable that the decision unit 2080 sets the captured image 12 which does not include the moving object as the background image 11. It is because the moving object is temporarily included in the imaging range of the camera 10 and will not be included in the imaging range of the camera 10 after a while in high probability. Note that, as described above, in the case where the first foreground area 13 does not represent the moving object, it is considered that the object represented by the first foreground area 13 is the motionless object which has been moved. For this reason, there is high probability that the moving object (for example, person) which has moved the motionless object is included in the captured image 12 for which it is determined that the first foreground area 13 does not represent the moving object or which is generated at a timing close to that of the captured image 12. It is preferable that the captured image 12 to be handled as the background image 11 is at least the captured image 12 which is generated after the moving object goes out of the imaging range of the camera 10.

Here, in the case where it is determined that the first foreground area 13 does not represent the moving object, the decision unit 2080 may update the background image 11 to the captured image 12 that is imaged after the captured image 12 from which the first foreground area 13 is extracted and that the foreground area other than the first foreground area 13 is not extracted. In this manner, it is possible to cause the moving object to be not included in the background image 11.

A process for determining the captured image 12 from which the foreground area other than the first foreground area 13 is not extracted may be realized by using, for example, the generation unit 2060. The generation unit 2060 sequentially extracts the foreground areas from the plurality of captured images 12, and generates and updates the history information for the object which is represented by the respective foreground areas. Thus, the decision unit 2080 is configured to be able to realize a fact that a foreground area other than the first foreground area 13 is not extracted through a sequential process of the generation unit 2060 regarding each captured image 12 generated after the captured image 12 from which the first foreground area 13 that is determined to not representing a moving object is extracted. However, the decision unit 2080 may determine the captured image 12 from which the foreground area other than the first foreground area 13 is not extracted, by performing a process for extracting the foreground areas from the respective captured images 12.

The method for updating the background image 11 is not limited to the above-described examples. For example, the decision unit 2080 may update the background image 11 by combining the above-described method according to the first example with the method according to the second example. Specifically, the decision unit 2080 updates the background image 11 for every predetermined time, as illustrated in the first example. Further, when the determination of "the first foreground area 13 does not represent the moving object" is performed by the determination unit 2020 in the predetermined time, the decision unit 2080 updates the background image 11 in response to the determination.

<Example of Hardware Configuration>

A hardware configuration of a computer which realizes the information processing apparatus 2000 according to the second example embodiment is represented with reference to, for example, FIG. 3 as the same as in the first example embodiment. However, program modules, which realize functions of the information processing apparatus 2000 according to the embodiment, are further stored in the storage device 1080 of the computer 1000 which realizes the information processing apparatus 2000 according to the embodiment.

Hereinabove, although the embodiments of the present invention are described with reference to the accompanying drawings, the embodiments are examples of the present invention, and it is possible to use a combination of the above-described respective embodiments or various configurations other than the embodiments.

For example, the motionless object extracted from the captured image 12 as the first foreground area 13 may include an object which is left after being moved from the outside of the imaging range of the camera 10 into the imaging range of the camera 10. For example, when a person carries a bag and leaves the bag in the imaging range of the camera 10, the bag is extracted as the foreground area since the bag is not included in the background image 11. According to the information processing apparatus 2000, the warning is output even when the first foreground area 13 represents the motionless object. Thus, it is possible for the user of the information processing apparatus 2000 to easily recognize that the object is left. Therefore, for example, it is possible to easily detect that a dangerous object or the like is left.

Although a part or whole of the embodiments is described as supplements below, the present invention is not limited thereto.

1. An information processing apparatus comprising:
    a determination unit that determines whether or not a first foreground area represents a moving object, the first foreground area being extracted from a first captured image generated by a camera; and
    a warning unit that outputs warning when it is determined that the first foreground area does not represent a moving object,
    wherein the determination unit executes:
    performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image;

acquiring history information which represents information regarding the object represented by the first foreground area at time before the first captured image is generated, and performing second determination of determining whether or not the object represented by the first foreground area is moving at the time before the first captured image is generated based on the acquired history information; and determining that the first foreground area does not represent the moving object when the object represented by the first foreground area is determined to be not moving by both of the first determination and the second determination.

2. The information processing apparatus according to 1, wherein the history information indicates an optical flow of the foreground area which represents the same object as the first foreground area, the optical flow being extracted from the captured image generated by the camera before the first captured image.

3. The information processing apparatus according to 2, wherein, in the second determination, the determination unit determines that the object represented by the first foreground area is not moving at the time before the first captured image is generated when a sum of the optical flow indicated in the acquired history information is less than a predetermined value.

4. The information processing apparatus according to 1, wherein the history information indicates a result of estimation of whether or not the foreground area represents the moving object, the estimation being performed using the captured image generated by the camera before the first captured image, and wherein, in the second determination, the determination unit determines that the object represented by the first foreground area is not moving at the time before the first captured image is generated when the history information indicating a result of the estimation that the foreground area does not represent the moving object is acquired.

5. The information processing apparatus according to any one of 1 to 4, further comprising:

a decision unit that, when it is determined that the first foreground area does not represent a moving object, updates a background image used in a process of extracting the foreground area from the captured image thereafter, the background image being updated to a captured image generated by the camera after time at which the first captured image is generated.

6. The information processing apparatus according to 5, wherein the decision unit updates the background image to the captured image which is generated by the camera after the time at which the first captured image is generated and from which a foreground area other than the first foreground area is not extracted.

7. A control method which is executed by a computer, the method comprising:

a determination step of determining whether or not a first foreground area represents a moving object, the first foreground area being extracted from a first captured image generated by a camera; and a warning step of outputting warning when it is determined that the first foreground area does not represent a moving object, wherein the determination step includes:

performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image;

acquiring history information which represents information regarding the object represented by the first foreground area at time before the first captured image is generated, and performing second determination of determining whether or not the object represented by the first foreground area is moving at the time before the first captured image is generated based on the acquired history information; and determining that the first foreground area does not represent the moving object when the object represented by the first foreground area is determined to be not moving by both of the first determination and the second determination.

8. The control method according to 7, wherein the history information indicates an optical flow of the foreground area which represents the same object as the first foreground area, the optical flow being extracted from the captured image generated by the camera before the first captured image.

9. The control method according to 8, wherein, in the determination step, in the second determination, it is determined that the object represented by the first foreground area is not moving at the time before the first captured image is generated when a sum of the optical flow indicated in the acquired history information is less than a predetermined value.

10. The control method according to 7, wherein the history information indicates a result of estimation of whether or not the foreground area represents the moving object, the estimation being performed using the captured image generated by the camera before the first captured image, and wherein, in the determination step, in the second determination, it is determined that the object represented by the first foreground area is not moving at the time before the first captured image is generated when the history information indicating a result of the estimation that the foreground area does not represent the moving object is acquired.

11. The control method according to any one of 7 to 10, further comprising:

a deciding step of, when it is determined that the first foreground area does not represent a moving object, updating a background image used in a process of extracting the foreground area from the captured image thereafter, the background image being updated to a captured image generated by the camera after time at which the first captured image is generated.

12. The control method according to 11, wherein, in the deciding step, the background image is updated to the captured image which is generated by the camera after the time at which the first captured image is generated and from which a foreground area other than the first foreground area is not extracted.

13. A program causing a computer to execute each step of the control method according to any one of 7 to 12.

What is claimed is:

1. An information processing apparatus comprising:
a determination unit that determines whether or not a first foreground area represents a moving object, the first foreground area being extracted from a first captured image generated by a camera; and
a warning unit that outputs warning when it is determined that the first foreground area does not represent a moving object, wherein the determination unit executes:
performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image;
acquiring history information which represents information regarding the object represented by the first foreground area at time before the first captured image is generated;
performing second determination of determining whether or not the object represented by the first foreground area is moving at the time before the first captured image is generated based on the acquired history information; and
determining that the first foreground area does not represent the moving object when the object represented by the first foreground area is determined to be not moving by both of the first determination and the second determination.

2. The information processing apparatus according to claim 1,
wherein the history information indicates an optical flow of the foreground area which represents the same object as the first foreground area, the optical flow being extracted from the captured image generated by the camera before the first captured image.

3. The information processing apparatus according to claim 2,
wherein, in the second determination, the determination unit determines that the object represented by the first foreground area is not moving at the time before the first captured image is generated when a sum of the optical flow indicated in the acquired history information is less than a predetermined value.

4. The information processing apparatus according to claim 1,
wherein the history information indicates a result of estimation of whether or not the foreground area represents the moving object, the estimation being performed using the captured image generated by the camera before the first captured image, and
wherein, in the second determination, the determination unit determines that the object represented by the first foreground area is not moving at the time before the first captured image is generated when the history information indicating a result of the estimation that the foreground area does not represent the moving object is acquired.

5. The information processing apparatus according to claim 1, further comprising:
a decision unit that, when it is determined that the first foreground area does not represent a moving object, updates a background image used in a process of extracting the foreground area from the captured image thereafter, the background image being updated to a captured image generated by the camera after time at which the first captured image is generated.

6. The information processing apparatus according to claim 5,
wherein the decision unit updates the background image to the captured image which is generated by the camera after the time at which the first captured image is generated and from which a foreground area other than the first foreground area is not extracted.

7. A control method which is executed by a computer, the method comprising:
determining whether or not a first foreground area represents a moving object, the first foreground area being extracted from a first captured image generated by a camera; and
outputting warning when it is determined that the first foreground area does not represent a moving object,
wherein the determination includes:
performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image;
acquiring history information which represents information regarding the object represented by the first foreground area at time before the first captured image is generated;
performing second determination of determining whether or not the object represented by the first foreground area is moving at the time before the first captured image is generated based on the acquired history information; and
determining that the first foreground area does not represent the moving object when the object represented by the first foreground area is determined to be not moving by both of the first determination and the second determination.

8. The control method according to claim 7,
wherein the history information indicates an optical flow of the foreground area which represents the same object as the first foreground area, the optical flow being extracted from the captured image generated by the camera before the first captured image.

9. The control method according to claim 8,
wherein, in the second determination, it is determined that the object represented by the first foreground area is not moving at the time before the first captured image is generated when a sum of the optical flow indicated in the acquired history information is less than a predetermined value.

10. The control method according to claim 7,
wherein the history information indicates a result of estimation of whether or not the foreground area represents the moving object, the estimation being performed using the captured image generated by the camera before the first captured image, and
wherein, in the second determination, it is determined that the object represented by the first foreground area is not moving at the time before the first captured image is generated when the history information indicating a result of the estimation that the foreground area does not represent the moving object is acquired.

11. The control method according to claim 7, further comprising:
when it is determined that the first foreground area does not represent a moving object, updating a background image used in a process of extracting the foreground area from the captured image thereafter, the background image being updated to a captured image generated by the camera after time at which the first captured image is generated.

12. The control method according to claim 11, wherein, the background image is updated to the captured image which is generated by the camera after the time at which the first captured image is generated and from which a foreground area other than the first foreground area is not extracted.

13. A non-transitory computer-readable storage medium storing a program causing a computer to execute:
  determining whether or not a first foreground area represents a moving object, the first foreground area being extracted from a first captured image generated by a camera; and
  outputting warning when it is determined that the first foreground area does not represent a moving object,
  wherein the determination includes:
    performing first determination of determining whether or not an object represented by the first foreground area is moving by comparing the first foreground area with a second foreground area, the second foreground area being a foreground area extracted from a second captured image that is generated by the camera before the first captured image, the second foreground area representing a same object as the first foreground image;
    acquiring history information which represents information regarding the object represented by the first foreground area at time before the first captured image is generated
    performing second determination of determining whether or not the object represented by the first foreground area is moving at the time before the first captured image is generated based on the acquired history information; and
  determining that the first foreground area does not represent the moving object when the object represented by the first foreground area is determined to be not moving by both of the first determination and the second determination.

* * * * *